Sept. 5, 1939.　　　　J. R. BALSLEY　　　　2,171,532
SOUND-REPRODUCING SYSTEM AND APPARATUS
Filed April 22, 1938
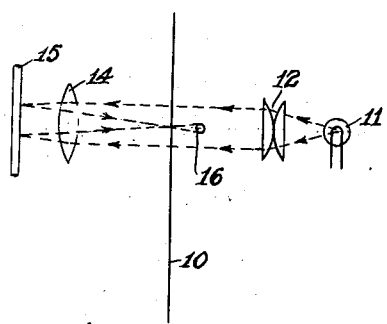
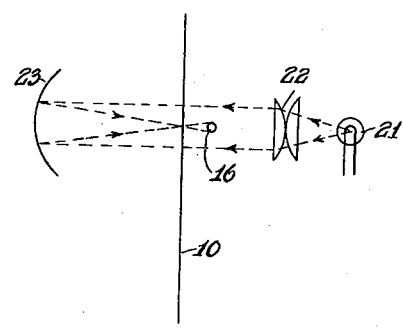
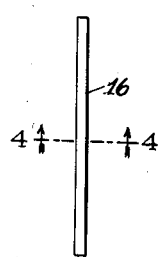
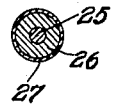
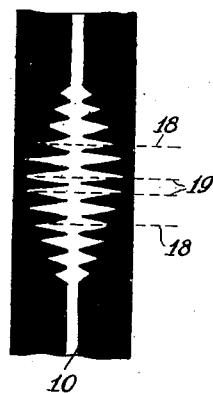
INVENTOR.
JAMES R. BALSLEY
BY WM. J. Outchaid
ATTORNEY.

Patented Sept. 5, 1939

2,171,532

UNITED STATES PATENT OFFICE 2,171,532

SOUND-REPRODUCING SYSTEM AND APPARATUS

James R. Balsley, Stamford, Conn., assignor to Ozaphane Corporation of America, Stamford, Conn., a corporation of Delaware Application April 22, 1938, Serial No. 203,525

5 Claims. (Cl. 179—100.3)

This invention relates to sound-reproducing systems, and more particularly to a novel and improved system for utilizing the average transmission of a photographic sound record of the so-called "anti-ground noise" or "noiseless" type for expanding the volume range of the reproduced signal, and to a novel and improved photoelectric cell for use therein.

An object of the invention is to provide a simple, convenient and dependable system of the above type.

Another object is to provide a novel and improved system in which a scanning ray is passed through a sound record, first in the form of a wide beam to be modulated in accordance with the average transmission of the record, and then in the form of a narrow beam for scanning the sound variations thereon.

Another object is to provide a photo-electric cell which may be placed directly in the light beam without interfering with the modulation thereof in accordance with the average transmission of the record.

Another object is to provide a photo-electric cell having small physical dimensions.

Another object is to provide a photo-electric cell having low capacity, so that it is capable of responding efficiently to high frequency variations.

Various other objects and advantages will be apparent as the nature of the invention is more fully disclosed.

Although the novel features which are believed to be characteristic of this invention will be more particularly pointed out in the claims appended hereto, the invention itself may be better understood by referring to the following description, taken in connection with the accompanying drawing, in which a specific embodiment of the invention has been set forth for purpose of illustration.

In the drawing,

Figure 1 is a diagrammatic view of a sound-reproducing system embodying the present invention;

Figure 2 is a similar diagrammatic view illustrating a different embodiment of the invention;

Figure 3 is an enlarged side elevation of the photo-electric cell used in the systems of Figures 1 and 2;

Figure 4 is an enlarged section taken on the line 4—4 of Figure 3; and

Figure 5 is a detail view of a photographic sound record of the type referred to herein.

In the following description and in the claims, certain specific terms are used for convenience in referring to various details of the invention. These terms are, however, to be given as broad an interpretation as the state of the art will permit.

Referring to the drawing more in detail, the invention is shown in Figure 1 as applied to a system for scanning a photographic sound record 10 which, as shown more in detail in Figure 5, is of the "anti-ground noise" or "noiseless" type in which the average transmission varies in accordance with the volume of the recorded sound. Such a record may be of the variable area or variable density type.

In Figure 1, an exciter lamp 11 is used as a source of light to provide a ray which is focused by a condenser lens 12 into the form of a comparatively wide beam which is passed directly through the record 10 and thence through a condenser lens 14 by which it is concentrated onto a mirror 15. The mirror 15 reflects the ray back through the condenser lens 14 by which it is focused in the form of a narrow beam which again passes through the record 10 and onto a photo-electric cell 16 of the type hereinafter more fully described.

The light beam which is passed through the record 10 from the condenser lens 12 may have a cross-sectional area corresponding to that defined by the dotted lines 18 in Figure 5. This area is such as to cover a plurality of wave lengths so that the beam, after passage through the record, is modulated in accordance with the average transmission thereof. The ray which is reflected from the mirror 15 is focused on the record in the form of a narrow beam, as indicated by the dotted lines 19 in Figure 5. This narrow beam corresponds in width to a scanning ray and is modulated in accordance with the sound variations in the usual manner. The narrow beam, after passage through the record, is focused on the photo-electric cell 16 and produces voltage variations therein which may be amplified and used for actuating a loud speaker (not shown).

The variations of the narrow beam applied to the cell 16 correspond to the sound variations on the record with a superimposed modulation corresponding to the average transmission of the record. Hence, the volume range is automatically expanded so as to compensate for the volume compression inherent in recording. It will be noted that the photo-electric cell 16 is disposed in the path of the wide beam which is applied to the record 10 from the condenser lens 12. The cell 16, however, is sufficiently small so as not to appreciably interfere with the passage of this beam through the record. The cell may be so positioned as to cause a narrow shadow on the record in the position through which the narrow reflected beam is passed therethrough.

The system shown in Figure 2 is generally similar to that of Figure 1. In this system, an exciter lamp 21 is used as a source of light which is focused by a condenser lens 22 in a wide beam which is passed through the record 10 and onto a reflector 23. The reflector 23 is of a shape adapted to focus the beam through the record 10 and onto the photo-electric cell 16 in the form of a narrow scanning beam. The operation of this system is similar to that of Figure 1, with the exception that the reflector 23 is used in place of the reflector 15 and condenser lens 14 of Figure 1.

The construction of the photo-electric cell 16 is shown more in detail in Figures 3 and 4. It will be noted that the cell comprises an elongated electrode, such as a wire 25, which is provided with a coating 26 of selenium or copper oxide or other materials producing a photovoltaic effect. This coating is covered with a thin transparent metallic layer 27. The wire 25 and the metallic layer 27 constitute the electrodes of the cell which may be connected by any suitable means to actuate the amplifier or other translating devices. The selenium or copper oxide is sensitized so that when light falls upon the cell, a voltage is produced at the surface of contact between the layer 27 and the coating 26. The cell is of the barrier layer type and operates in the usual manner to produce a voltage which fluctuates in accordance with the light intensity.

It will be noted that in this cell, the capacity is reduced to a minimum due to the size and shape of the electrodes, and particularly of the thin wire 25. The cell is accordingly suitable for use with high frequencies and in addition, due to its small size, can be placed directly in the beam of light from the condenser lens 12, of Figure 1, or condenser lens 22, of Figure 2, without materially interfering with the passage of the beam through the sound record. It is to be understood, of course, that the cell is useful in various other scanning systems and may be used, in general, in systems where high frequency variations are involved. Furthermore, the present system may be used with other types of cells provided the physical dimensions are such that they may be placed directly within the wide beam without unduly interfering therewith.

Although a specific embodiment of the invention has been shown for purpose of illustration, it is understood that the invention is not to be limited thereto but is only to be limited in accordance with the following claims when interpreted in view of the prior art.

I claim:

1. In a system for reproducing sound from a photographic record of the type in which the average transmission varies in accordance with the volume of the recorded sound, an exciter lamp, means passing light therefrom in the form of a wide beam through said record, a photo-electric cell interposed in said beam between said source and said record, and means reflecting said beam and re-passing the same through said record in the form of a narrow beam for scanning purposes, said photo-electric cell being positioned to be actuated by said narrow beam whereby said cell is responsive to both the instantaneous and the average transmission of the record.

2. In a system for reproducing sound from a photographic record of the type in which the average transmission varies in accordance with the volume of the recorded sound, an exciter lamp, a condenser lens focusing light from said lamp in the form of a wide beam and passing the same through said record, a photo-electric cell interposed in said beam between said lens and said record, and a reflector adapted to reflect and re-pass said beam through said record onto said cell in the form of a narrow scanning beam.

3. In a system for reproducing sound from a photographic record of the type in which the average transmission varies in accordance with the volume of the recorded sound, an exciter lamp, a condenser lens focusing light from said lamp in the form of a wide beam and passing the same through said record, a photo-electric cell interposed in said beam between said lens and said record, and reflector means comprising a condenser lens and reflector adapted to reflect and re-pass said beam through said record onto said cell in the form of a narrow scanning beam.

4. In a system for reproducing sound from a photographic record of the type in which the average transmission varies in accordance with the volume of the recorded sound, an exciter lamp, means passing light therefrom in the form of a wide beam through said record, a photo-electric cell interposed in said beam between said source and said record, said cell having an area less than that of said beam whereby the passage of said beam through said record is substantially unimpeded thereby, and means reflecting said beam and re-passing the same through said record in the form of a narrow beam for scanning purposes, said photo-electric cell being positioned to be actuated by said narrow beam whereby said cell is responsive to both the instantaneous and the average transmission of the record.

5. In a system for reproducing sound from a photographic record of the type in which the average transmission varies in accordance with the volume of the recorded sound, an exciter lamp, means passing light therefrom in the form of a wide beam through said record, a photo-electric cell interposed in said beam between said source and said record, said cell comprising a fine wire having a coating of photo-electric material and being of a dimension substantially less than that of said beam whereby the passage of said beam through said record is substantially unimpeded thereby, and means reflecting said beam and re-passing the same through said record in the form of a narrow beam for scanning purposes, said photo-electric cell being positioned to be actuated by said narrow beam whereby said cell is responsive to both the instantaneous and the average transmission of the record.

JAMES R. BALSLEY.